United States Patent [19]

Gotoh et al.

[11] Patent Number: 5,089,375
[45] Date of Patent: Feb. 18, 1992

[54] OPTICAL INFORMATION RECORDING MEDIUM AND PRODUCTION METHOD THEREOF

[75] Inventors: Akira Gotoh; Yukinobu Yamazaki; Naoyuki Kikuchi, all of Toride, Japan

[73] Assignee: Hitachi Maxell, Ltd., Osaka, Japan

[21] Appl. No.: 443,397

[22] Filed: Nov. 30, 1989

Related U.S. Application Data

[63] Continuation of Ser. No. 114,844, Oct. 30, 1987, abandoned.

[30] Foreign Application Priority Data

Oct. 30, 1986 [JP] Japan .................. 61-257047
Feb. 18, 1987 [JP] Japan .................. 62-33504

[51] Int. Cl.⁵ ............................................ G03C 1/76
[52] U.S. Cl. ........................................ 430/271; 430/495; 430/270; 427/37; 427/255.2; 428/147
[58] Field of Search ............ 430/270, 271, 495; 428/147; 427/37, 255.2

[56] References Cited

U.S. PATENT DOCUMENTS

| | | | |
|---|---|---|---|
| 3,983,564 | 7/1976 | Nakazawa et al. | 430/495 |
| 4,492,718 | 1/1985 | Mayer et al. | 427/160 |
| 4,522,846 | 6/1985 | Mayer et al. | 427/54.1 |
| 4,565,772 | 1/1986 | Takeoda et al. | 430/320 |
| 4,592,939 | 6/1986 | Temple et al. | 428/64 |
| 4,731,620 | 3/1988 | Yabe et al. | 346/137 |

OTHER PUBLICATIONS

"Intercept" and Interrupt, *Webster's II New Riverside University Dictionary*, Riverside Publishing Co., 1984, pp. 635-638.

Primary Examiner—Marion E. McCamish
Assistant Examiner—C. D. RoDee
Attorney, Agent, or Firm—Birch, Stewart, Kolasch & Birch

[57] ABSTRACT

In a film forming method of an organic thin film for an optical information recording medium, the speed of forming the film can be increased and the quantity of the waste dust which is produced in the process of film forming can be decreased. Moreover, the ratio of the number of fluorine atoms to the number of the carbon atoms contained in the under layer is controlled to be less than 1.8, whereby the heat resistance of the under layer is improved and thermal deformation of an uneven pattern of the substrate can be prevented so that the endurance life of the optical information recording medium can be prolonged.

11 Claims, 7 Drawing Sheets

OPTICAL INFORMATION RECORDING MEDIUM AND PRODUCTION METHOD THEREOF

BACKGROUND OF THE INVENTION

1. Field of the Invention

The present invention relates to an optical information recording medium and a method of the production of organic thin film which is used as an under layer of an optical information recording medium on which pits are formed.

2. Description of the Prior Art

Figure 1:
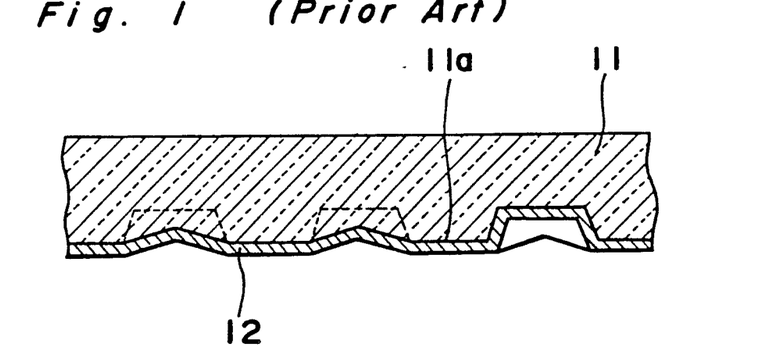
FIG. 1 is a cross sectional view showing an example of a film structure of a conventional optical information recording medium.

As shown in FIG. 1, there has been known an optical information recording disc having a recording layer 12 made of heat mode recording material, such as low melting point metal and organic dye material, formed on a signal receiving surface 11a of a substrate 11 which is made of transparent material, such as glass or plastic resin material. In this kind of optical information recording disc, when a radiation beam modulated by an information signal is radiated from the side of the substrate 11 onto the recording layer 12, the portion radiated by the radiation beam is partly heated so that there occurs a thermal deformation, such as melting, evaporation and shrinkage in the recording layer 12, and the information signal is recorded in a form of a pit (such as a through hole or groove).

However, in the case when the recording layer 12 made of this kind of recording material mentioned above is formed directly on the substrate 11, the recording sensitivity of the optical information recording disc is lowered and there are problems encountered such that, (1) a recording light source of high power is needed, and (2) since the angular velocity of the substrate 11 to the optical head can not be made high, improvement of the recording density and increasing the data transfer speed can not be achieved.

Figure 2:
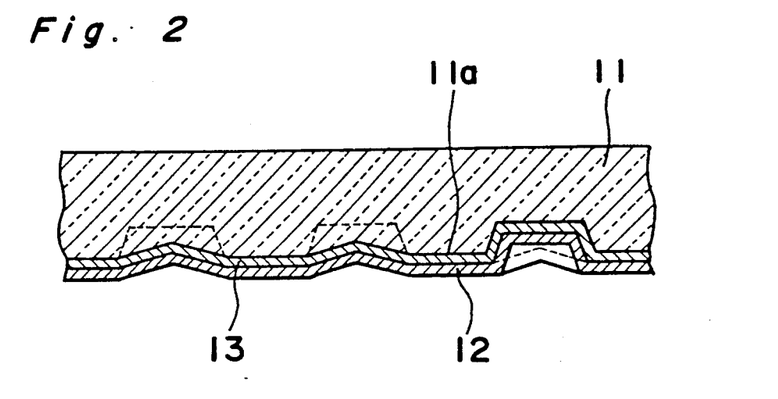
FIG. 2 is a cross sectional view showing a film structure of an optical information recording medium which was previously proposed by the present applicant.

In order to solve the problems mentioned above, the present applicant has previously proposed, in Japanese Patent Application No. 59437/1986, an optical information recording medium having an intermediate layer 13 made of an organic compound which is meltable, decomposable or sublimatable at a lower temperature than the melting, decomposing or sublimation temperature of the recording layer 12, including at least fluorine and carbon, formed between the substrate 11 and the recording layer 12, as shown in FIG. 2.

In the optical information recording medium shown in FIG. 2, since between the substrate 11 and the recording layer 12 there is provided an under layer 13 made of polytetrafluoroethylene (referred to as PTFE hereinafter) having a heat resistance against the temperature better than that against the temperature of the thermal deformation of the uneven pattern formed on the substrate 11, it becomes harder for the heat at the time of the radiation of the laser light beam for playback to be conducted to the surface of the substrate where the uneven pattern is formed, so that thermal deformation of the uneven pattern is prevented and the degree of the decrement of the carrier to noise level (referred to as CN hereinafter) ratio of the read out signal with the lapse of time is lowered. Since the under layer made of PTFE is melted or decomposed at a temperature lower than the melting temperature of the recording layer, the thermal deformation of the recording layer is accelerated so that the recording sensitivity can be improved. Herein, a sputtering method is adopted as a method of forming the middle layer 13.

However, according to a conventional method of sputtering PTFE in fluorocarbon gas, the partial pressure of which is less than 3 % in the vacuum tank, while high quality thin films of high density with few pin holes can be formed, the speed of forming the film is slow (approximately 1.5 Å/sec.) and there is a problem that the productivity is low.

Moreover, it is difficult to bond the PTFE of plate shape to a cathode surface with an adhesive and the bonding intensity between the PTFE plate and the cathode surface is so small that the PTFE plate is easily peeled off due to the heating at the time of sputtering. Therefore, the PTFE plate has to be mechanically secured to the cathode by means of screws. However, since the central portion of the PTFE plate, which is not secured to the cathode, is thermally deformed due to the plasma atmosphere and the sputtering processing, the thin film can not be formed effectively.

Furthermore, in the case when the thickness of the PTFE plate is made to be more than 8 mm, the thermal conductivity of the PTFE plate is so small that the PTFE plate becomes easily deformed due to the heat caused by the sputtering processing in the plasma atmosphere.

Though the plasma polymerization method has been known as a method of forming an organic thin film at a high speed, in the case of the plasma polymerization method, since the organic thin film is formed by supplying a lot of monomer into a vacuum tank, there is produced a lot of waste dust of the polymer between the electrodes, therefore, there are problems that the vacuum tank and the environment are contaminated or a pump system is apt to be easily damaged and that a great labor is needed for the maintenance of the device for forming the thin film.

Furthermore, in the optical information recording disc having an under layer formed of PTFE, compared to the optical information recording disc having an under layer of evaporation or plasma polymerization film made of materials such as guanine or hydrocarbon shown in the invention of the previous application, in the case when the playback operation is repeated for ten hours, the value of the laser power at the time of generating a signal fluctuation of ±10% is lower (the values of the laser power are respectively 1.5 mW in the case of the guanine under layer and 1.6 mW in the case of the hydrocarbon plasma polymerization film under layer, while on the other hand, 1.3 mW in the case of PTFE under layer) and the signal readily becomes inferior when used for a long period. Moreover, there is a problem that, in order to obtain the aforementioned value by using the under layer made of PTFE, the thickness of the under layer should be made approximately 800 Å (the thickness is 300 Å in the case of the under layers of guanine and hydrocarbon plasma polymerization film), therefore, the productivity of the optical information recording medium is lower compared to those cases when forming the under layer made of guanine or hydrocarbon plasma polymerization film.

SUMMARY OF THE INVENTION

The present invention is made to solve the problems inherent in the prior art mentioned above, and has as its essential object to provide a method for the production of an optical information recording medium in which the under layer, made of PTFE, can be much more suitable for practical use.

Another object of the present invention is to provide a method of the production of an organic film for use in an optical recording medium which can be easily made.

A further object of the present invention is to provide an optical recording medium having an under layer so that the recording and reproducing properties can be improved.

The inventors of the present application have determined the following facts from the results of their study.

The problems mentioned above are mainly caused by the fact that the heat resistance (such as melting point) of PTFE is lower than that of guanine or hydrocarbon plasma polymerization film, that the rate (the ratio of the number of atoms) of fluorine to carbon contained in the PTFE under layer is regulate so as to adjust the heat resistance of the PTFE under layer, and that upon introducing hydrogen gas, hydrocarbon gas or fluorocarbon compound gas into an inert gas (sputtering gas) at the time of sputtering the PTFE material, the rate of the number of the fluorine atoms to the number of the carbon atoms included in the under layer formed to be a film condition can be lowered.

From the results of their experiments, they also have determined that there is a mutual relation between the electric power supplied at the time of sputtering organic materials onto the substrate, the partial pressure of the gas (referred to as target gas hereinafter) injected from the target or added gas other than the inert gas supplied from the outside and the speed of forming the film, and, in the case that the supplied power is in a range more than a predetermined degree, the partial pressure of the additive gas becomes large in proportion to the amount of the supplied power and the speed of forming the film is also in proportion to the partial pressure of the additive gas.

When the partial pressure of the additive gas in the vacuum tank is adjusted to be 10%, the speed of forming the film becomes approximately 4 Å/sec. so that the productivity of the optical information recording disc necessary for practical use can be obtained.

The present invention is predicted on the basis of the aforementioned knowledge, and the production process of the under layer is described as follows.

When forming a light permeable thin film including at least fluorine and carbon onto the signal receiving surface of a substrate, the inert gas is supplied into the vacuum tank until the internal gas pressure of the tank becomes a predetermined value of pressure. After that, the AC power switch is turned on for supplying power. Subsequently, after the condition of the plasma is stabilized, at least one sort of gas selected from a group consisting of hydrogen gas, hydrocarbon gas, and fluorocarbon compound gas is supplied so as to be mixed with the inert gas. The selected gas and/or target gas may be mixed with the inert gas. After the internal gas pressure of the vacuum tank is adjusted to a predetermined value and the partial pressure of the additive gas is adjusted to more than 10%, upon sputtering the fluoroethylene polymer as a target in the mixed gas, the under layer is formed onto the substrate.

Furthermore, in the optical information recording medium according to the present invention, there may be provided an under layer between the substrate and the recording layer, wherein the under layer has main components of fluorine and carbon and the rate (ratio) of the number of the fluorine atoms to the number of the carbon atoms is adjusted to be less than 1.8.

DETAILED DESCRIPTION OF THE PREFERRED EMBODIMENT

Figure 3:
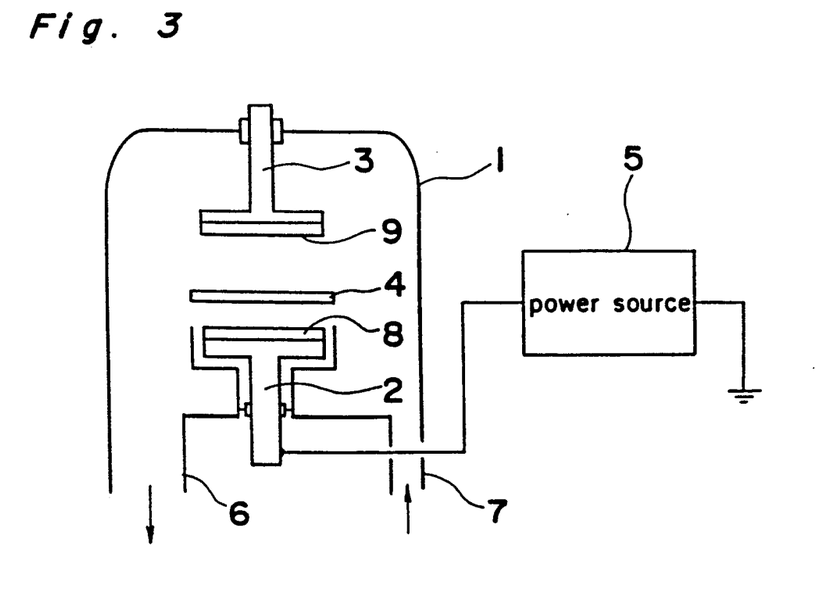
FIG. 3 is a schematic cross sectional view showing an example of a vacuum film forming device adapted to a method of forming a film made of organic material according to the present invention, FIG. 4(1) is a block diagram showing the operation of the vacuum film forming device in FIG. 3, FIGS. 4(2)-A to 4(2)-C are graphs showing the conditions of the gas flow, gas pressure and AC power with the lapse of time of the supplying power before the sputtering processing is started.
Figure 4:
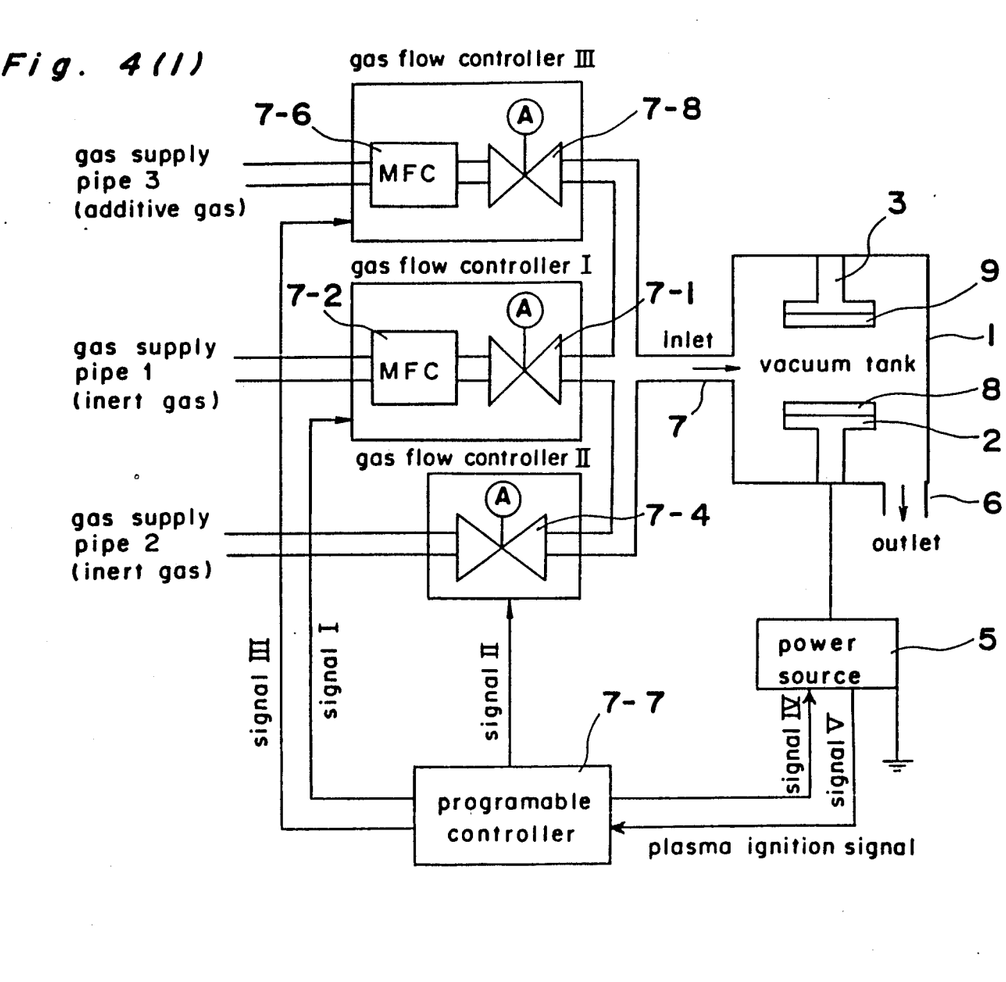

As shown in FIG. 3, a vacuum film forming device mainly comprises a vacuum tank 1, an electrode 2 and a substrate holder 3 accommodated in the vacuum tank 1, a shutter 4, which is disposed between the electrode 2 and the substrate holder 3, and a power source 5 for supplying power between the electrode 2 and the substrate holder 3.

There are provided an outlet 6 and an inlet 7 for supplying gas to the vacuum tank 1, which are respectively connected to an exhaust pump and to a gas supplying cylinder (not shown).

The electrode 2 is a magnetron type cathode and there is attached a target 8 of a plate or block shaped on the surface of the electrode 2, opposing the substrate holder 3.

In addition, there is attached a desirable substrate 9, such as a transparent substrate for an optical disc, on the surface of the substrate holder 3, opposing the electrode 2.

In the case when the target 8 of block shape is made of a PTFE plate however, it is not bonded with an adhesive material; upon exposing the surface of the PTFE plate in the atmosphere of Ar plasma under the vacuum condition or upon washing the surface of the PTFE plate with tetrahydrofuran in which some pieces of Na metal are scattered and drying the PTFE plate so as to be brown, the target 8 made of PTFE plate can be bonded fixedly with the adhesive, especially with an adhesive of an epoxy group such as Araldite, which is a trade name of the adhesive goods produced by Ciba Ltd. It may be considered that, since the fluorine atoms at the surface of the target plate are removed so as to increase the density of the carbon atoms included in the surface of the target plate, by executing the chemical processing and plasma processing, it becomes possible to bond the target plate, made of PTFE, with the surface of the cathode. Accordingly, the surface of the PTFE plate processed as described above can be securely bonded with the surface of the cathode 2 practically by using the adhesive mentioned above.

Furthermore, in order that the PTFE plate 8 is not thermally deformed in a high temperature atmosphere of plasma, such as Ar plasma, or even in a high temperature atmosphere at the time of the sputtering processing, it is an essential point to make the thickness of the PTFE plate less than 8 mm, preferably in a range of 7.5 mm to 1.5 mm thick. The thickness of the target plate mode of PTFE is preferably greater than 2.5 and less than 8 mm.

In the case of forming a film made of an organic material by means of the vacuum film forming device mentioned above, first, the exhaust pump is driven so as to create a vacuum on the inside of the vacuum tank 1. When the inside of the vacuum tank 1 reach a predetermined degree of vacuum, the gas supply pump is driven so as to supply a predetermined flow of the first inert gas such, as argon gas, which is controlled by a mass flow controller (referred to as MFC hereinafter) 7-2, from a gas supply pipe 1a into the vacuum tank 1, as shown in FIG. 4(1). Subsequently, a second inert gas for plasma ignition, such as argon gas, is supplied at a predetermined degree of gas pressure from a gas supply pipe 2a into the vacuum tank 1 through a gas controller II, FIG. 4(1), controlling the intermittent periodical flow of the gas, as shown in FIGS. 4(2)-(A), 4(2)-(B) and 4(2)-(C). Herein, valves 7-1, 7-4 and 7-8, shown in FIG. 4(1), automatically control the supply gas flow, and at the time of the ignition of the plasma, the supply of the inert gas from the gas supply pipe 2a is automatically intercepted. The plasma discharging occurs most easily under an atmosphere of a predetermined gas pressure and supplying power according to MATHIESSEN's law. In the prior art, on the basis of MATHIESSEN's law, a large amount of inert gas (approximately $10^{-2}$ torr) and predetermined power are initially supplied into the vacuum tank so that the plasma discharging process is started when the internal gas pressure of the vacuum tank is lowered to a predetermined value. With this method, however, there is a problem that, if the supplying power is too much great, the target is destroyed, and if too small, the discharging does not occur. In the film forming method according to the present invention, the inert gas is intermittently fed into the vacuum tank and the supplying power is gradually raised so that the problem mentioned above can be eliminated. Next, electric power is automatically applied from the power source 5 to the target 8 attached to the cathode 2 for sputtering. There are two methods to make an atmosphere capable of sputtering as follows. The first method is that at least one type of gas selected from a group consisting of hydrogen gas, hydrocarbon gas and fluorocarbon gas is fed from an additive gas supply pipe 3d into the vacuum tank 1 through MFC 7-6 controlling the gas flow to a predetermined quantity.

The second method is that, instead of supplying the additive gas, the target 8 for sputtering, made of the PTFE plate, is securely bonded to the cathode 2 and electric power is supplied so as to generate fluorocarbon compound gas to a predetermined degree of gas pressure. The first method is characterized in that the type, material and properties of the under layer compound can be varied by changing the type and the supplying gas flow of the additive gas so as to make the material of the under layer preferably the best. The second method is characterized in that, since the target is made of PTFE, the under layer made of fluorocarbon having a predetermined component can be made inexpensively with high productivity, geared to mass production.

After completing the preparation mentioned above, the sputtering process for forming the under layer is started. The best preferable condition of the whole part of the device for forming the under layer by the sputtering method is made by controlling a programable controller 7-7. Next, the power source 5 is turned on and electric power is supplied between the electrode 2 and the substrate holder 3. In accordance with this operation mentioned above, the inert gas fed into the vacuum tank 1 is changed into plasma condition so that the target made of organic material disposed on the electrode 2 is sputtered so as to be coated onto the substrate 9.

Figure 5:
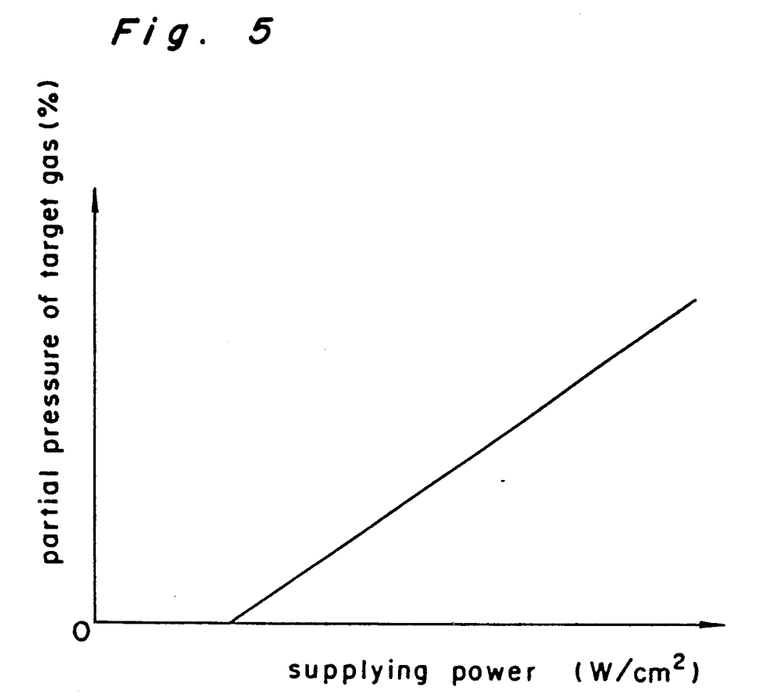
FIG. 5 is a graph showing a relation between the supplying power and the partial pressure of the target gas in the vacuum tank.

FIG. 5 is a graph qualitatively showing a relation between the supplying power and the partial pressure of the target gas in the vacuum tank 1 and, as shown in this graph, in the range of low supplying power, the partial pressure of the target gas is maintained approximately 0% even though the supplying power is increased, and when the supplying power exceeds a predetermined value, the partial pressure of the target gas is raised up in proportion to the supplying power. The bound value of the supplying power when the partial pressure of the target gas begins to rise up is slightly different according to the type of the target.

Figure 6:
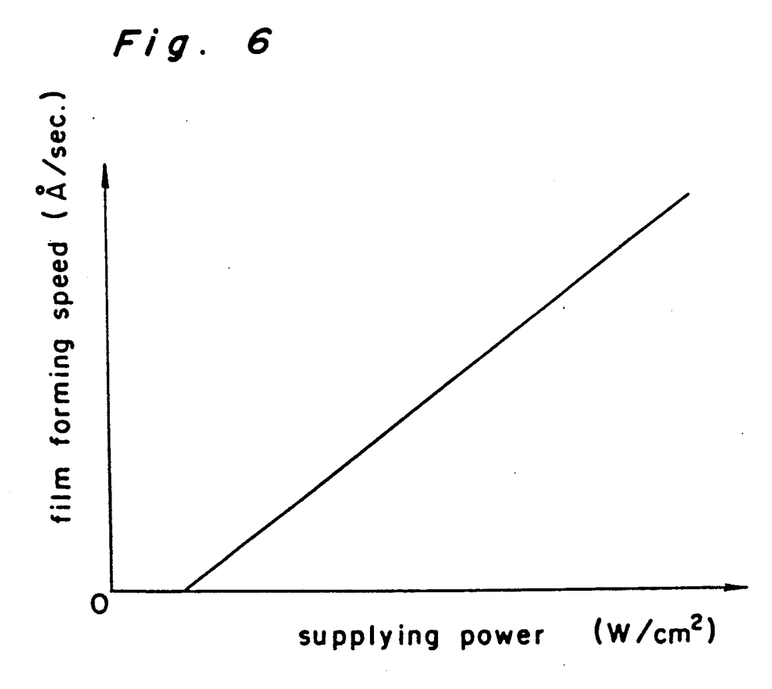
FIG. 6 is a graph showing a relation between the partial pressure of the target gas in the vacuum tank and the film forming speed.

FIG. 6 is a graph qualitatively showing a relation between the partial pressure of the target gas and the speed of forming the film and, as shown in this graph, even though the partial pressure of the target gas in the vacuum tank 1 is approximately 0%, some degree of speed of forming the film can be obtained, and the film forming speed is increased in proportion to the value of the partial pressure of the target gas.

Therefore, the film forming speed can be controlled by adjusting the supplying power.

FIG. 2 is a partial cross sectional view showing an optical information recording medium according to the present invention, wherein reference numeral 11 denotes a substrate, numeral 11a denotes an uneven pattern, numeral 12 denotes a recording layer and numeral 13 denotes an under layer.

The substrate 11 is formed in a disc shape with a predetermined diameter, having a center hole at the central portion thereof by using high polymeric materials such as PMMA (polymethylmethacrylate), PC (polycarbonate) and epoxy resin. On the under surface of the substrate 11, there is replicated an uneven pattern 11a, such as a pregroove corresponding to a tracking information and a prepit corresponding to an address signal. As a production method of the substrate 11, any molding method can be adopted corresponding to the material thereof and an injection molding method is preferable to the materials of PMMA and PC, and a casting method or 2P method (photo polymerization method) is preferable to the material of epoxy resin.

The under layer 13 is made of materials such as PTFE mainly including fluorine and carbon, wherein the ratio (F/C) of the number of the fluorine atoms (F) to the number of the carbon atoms (C) is adjusted to be less than 1.8. According to the study of the present invention, referring to the material mainly including fluorine and carbon, in case the ratio (F/C) of the number of the fluorine atoms to the number of the carbon atoms is lowered, the melting point of the material is raised up, and in the case of the ratio (F/C)≦1.8, the under layer having an effect of preventing thermal deformation of the uneven pattern nearly equal to that of the under layer made of guanine or hydrocarbon plasma polymerization film, which was previously proposed by the present applicant, can be obtained.

As a method of forming the material of the under layer on the surface of the substrate 11, though a method may be so adopted that a target including fluorine and carbon at a predetermined rate is previously made and the target can be sputtered in a high degree of vacuum, it is especially efficient to adopt a method as follows. That is, the target made of PTFE and the substrate 11 are disposed in a predetermined arrangement in a vacuum tank and the desired degree of vacuum established inside of the vacuum tank. Next, an inert gas is supplied into the vacuum tank to a predetermined degree of the gas pressure and then at least one type of gas selected from the group consisting of hydrogen gas, hydrocarbon gas and fluorocarbon compound gas is supplied into the vacuum tank, so that the internal gas pressure of the vacuum tank is adjusted to a predetermined value. Then, in the atmosphere of the compound gas, there is applied a voltage between the target and the opposing electrode provided in the vacuum tank so that electric discharge is generated and the target is sputtered by accelerated ions so as to form a thin film of PTFE onto the surface of the substrate 11. The concrete sputtering conditions, such as the components and the gas pressure of the mixed gas and the voltage applied between the target and the opposing electrode are adjusted, if necessary.

The recording layer 12 is made of low melting point metal, such as Te or an alloy mainly including Te. As a method of forming the recording layer 12, any method of forming a thin film such, as a vacuum evaporation method, or a sputtering method belonging to the known methods can be adopted. When the under layer 13 is formed, if the target for the recording layer is accommodated in the vacuum tank at the same time and the recording layer is sputtered subsequently to the process of forming the under layer, the efficiency of forming the film of the recording layer can be even more improved.

PREFERRED EMBODIMENT

Concrete examples according to the present invention will be described, referring to the effect of the present invention as follows.

EXAMPLE 1

In the vacuum film forming device shown in FIG. 3, there are provided a magnetron cathode 2 of 5 inches diameter and a high frequency power source 5 of 13.56 MHz and attached a target 8 made of PTFE to the magnetron cathode.

The inside of the vacuum tank 1 of the vacuum film forming device is vacuumized and argon gas is fed into the vacuum tank so that the internal gas pressure of the vacuum tank 1 is adjusted to $4.5 \times 10^{-3}$ Torr. Under this condition, high frequency power of 0.8 W/cm$^2$ is supplied to the magnetron cathode 2, whereby the evaporation material of the PTFE target 8 is coated onto the substrate 9.

EXAMPLE 2

Using a vacuum film forming device similar to that adopted in the example 1, under the same condition of the gas pressure as that in the example 1, high frequency power of 1.2 W/cm$^2$ is supplied to the magnetron cathode 2 so that PTFE film of approximately 400 Å thick is formed onto the substrate 9.

EXAMPLE 3

Using a vacuum film forming device similar to that adopted in the example 1, under the same condition of the gas pressure thereof, high frequency power of 1.6 W/cm$^2$ is supplied to the magnetron cathode 2 so that PTFE film of approximately 400 Å thick is formed onto the substrate 9.

EXAMPLE 4

Using a vacuum film forming device similar to that adopted in the example 1, under the same condition of the gas pressure thereof, high frequency power of 2.0 W/cm$^2$ is supplied to the magnetron cathode 2 so that PTFE film of approximately 400 Å thick is formed onto the substrate 9.

EXAMPLE 5

Using a vacuum film forming device similar to that adopted in the example 1, under the same condition of the gas pressure thereof, high frequency power of 2.4 W/cm$^2$ is supplied to the magnetron cathode 2 so that PTFE film of approximately 400 Å thick is formed onto the substrate 9.

Figure 7:
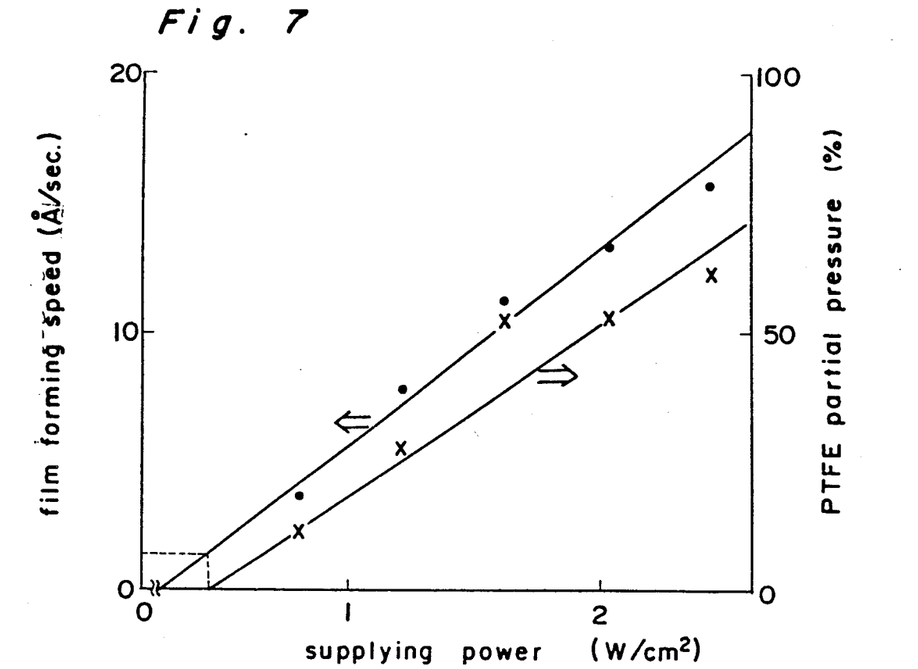
FIG. 7 is a graph showing relations between the supplying power and the partial pressure of PTFE gas (the target gas) in the vacuum tank and between the supplying power and the film forming speed.

The relation between the supplying power and the partial pressure of the PTFE gas (the target gas) in the vacuum tank 1 and the relation between the supplying power and the film forming speed in the cases of the examples 1 to 5 are shown in FIG. 7.

As shown in FIG. 7, in the case of using the PTFE target, if the power is supplied more than approximately 0.47 W/cm$^2$, the partial pressure of the PTFE gas in the vacuum tank 1 begins to rise up in proportion to the supplying power at a rate of approximately 35% per supplying power of 1 W/cm$^2$. If the power is supplied more than approximately 0.26 W/cm$^2$, the film forming speed begins to rise up in proportion to the supplying power at a rate of approximately 8 Å/sec. per supplying power of 1 W/cm$^2$.

Figure 8:
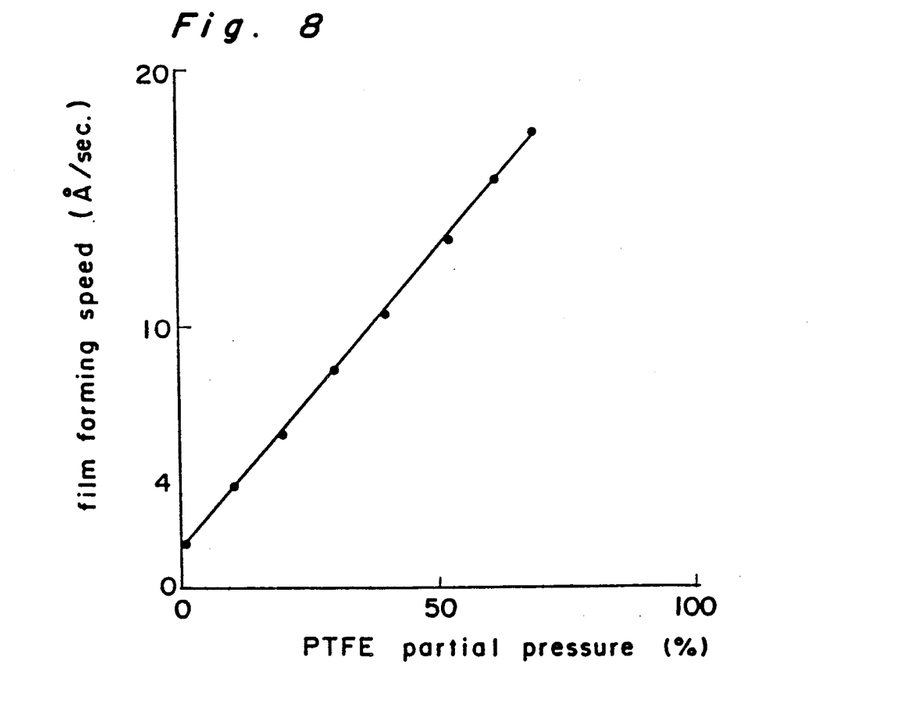
FIG. 8 is a graph showing a relation between the partial pressure of the PTFE gas (the target gas) in the vacuum tank and the film forming speed.

The relation between the partial pressure of the PTFE gas in the vacuum tank 1 and the film forming speed, which is obtained in FIG. 7, is shown in FIG. 8. As shown in FIG. 8, the film forming speed of approximately 1.5 Å/sec. can be obtained even though the partial pressure of the PTFE gas in the vacuum tank 1 is generally 0% and if the partial pressure of the PTFE gas is raised 10% up, the film forming speed can be increased with a rate of nearly 2.5 Å/sec.

As described above, any necessary film forming speed can be selected from the data shown in FIGS. 7 and 8. When the power of 0.8 W/cm$^2$ is supplied for example, the film forming speed of 4 Å/sec. can be obtained from the data in FIG. 7, which is approximately three times as the film forming speed of the conventional sputtering method. Even though the partial pressure of the target gas in the vacuum tank 1 is made 60% for example, the quantity of the produced monomer is approximately two-thirds compared with that in the case of the plasma polymerization method, so that the waste dust corresponding to the decrement of the monomer can be decreased. Moreover, according to the conventional plasma polymerization method, since the monomer accumulated on the electrode opposing to the substrate is apt to be easily peeled off, so the quantity of the waste dust is increased. But according to the present invention, since the monomer of the same or generally same quality as the target is accumulated on the corresponding target, the bonding ability between the target and the accumulated monomer is good, so that the accumulated monomer is little to be peeled off. Therefore, the quantity of the waste dust corresponding to the decrement of the peeled off monomer can be further decreased.

Figure 9:
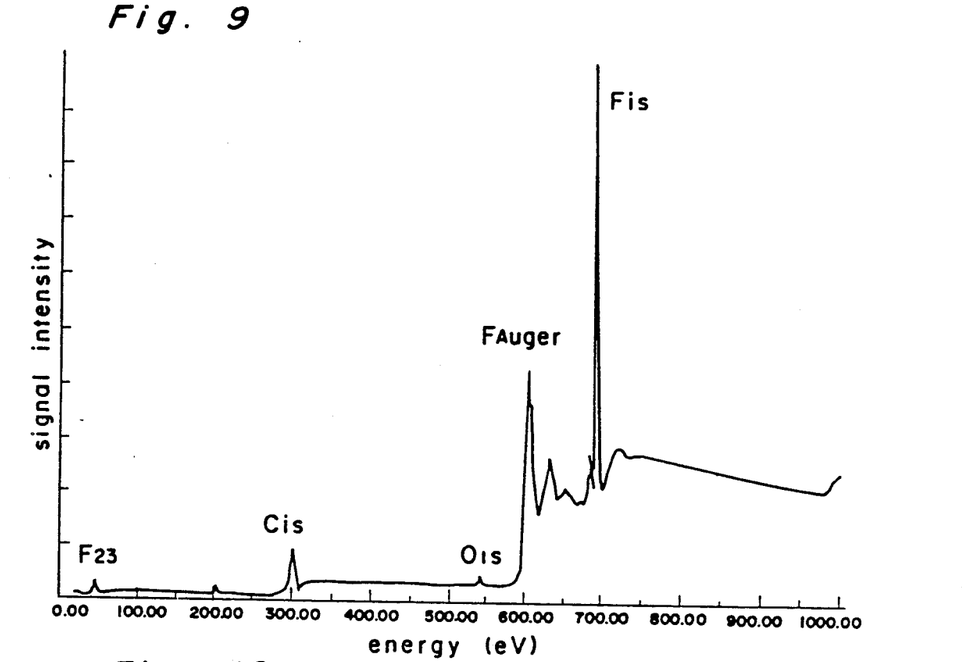
FIG. 9 is a graph showing a wide scan XPS spectrum of the PTFE film formed by a film forming method according to the present invention.
Figure 10:
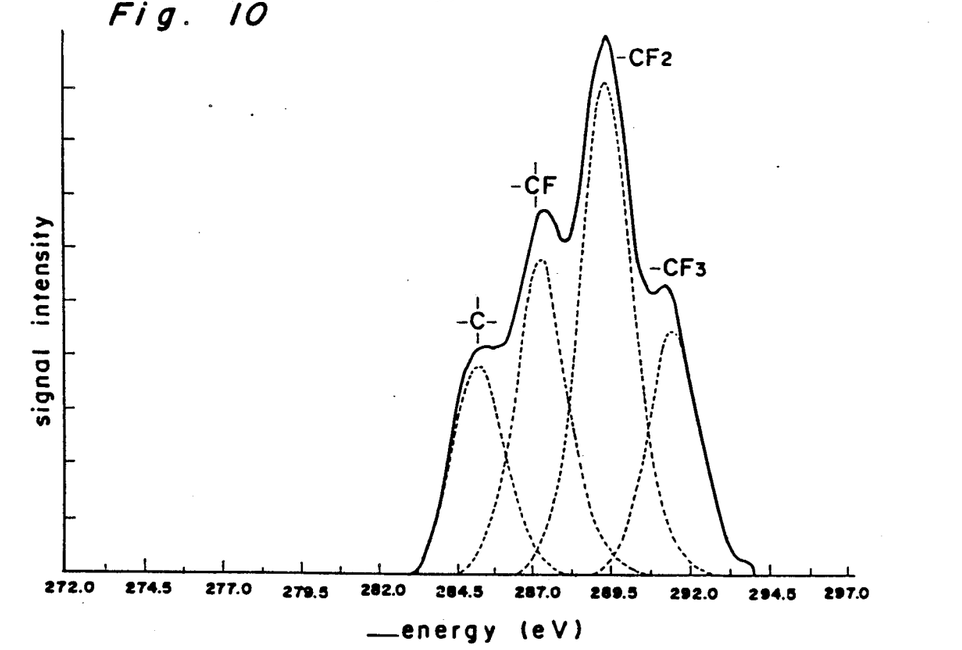
FIG. 10 is a graph showing a $C_{ls}$ spectrum.

The XPS (X-ray photoelectron spectroscopy) spectrum of the PTFE film formed in the manner described is shown in FIGS. 9 and 10, wherein FIG. 9 shows a wide scan spectrum and FIG. 10 shows a $C_{ls}$ spectrum. As shown in FIG. 10, the $C_{ls}$ spectrum of the PTFE film formed as described above contains a lot of PTFE having one carbon atom connected by two fluorine atoms ($-CF_2-$), and it was determined that a thin film generally the same as the thin film formed by general sputtering method under the condition of the partial pressure of less than 1% of the PTFE gas in the vacuum tank 1 can be obtained.

In this example, though the explanation is made in the case of using a target made of PTFE, the essential point of the present invention is not limited to this, and the present invention can be adapted to the case of forming a film with any other organic material including at least fluorine and carbon. Also in the case of using any other organic material mentioned above, the result generally similar to that described above can be obtained.

Moreover, in this example mentioned above, though the explanation is made about the case of controlling the film forming speed by controlling the supplying power, the present invention is not limited to this and the film forming speed can be also controlled by controlling the partial pressure of the target gas in the vacuum tank 1.

EXAMPLE 6

In the vacuum tank 1, there is provided a target made of PTFE and a substrate made of PC on the one surface of which pregrooves and prepits are formed by the injection molding method and the inside of the vacuum tank 1 is vacuumized to the pressure of $8 \times 10^{-4}$ Pa ($6 \times 10^{-6}$ torr). Next, argon gas mixed with TFC (tetrafluorocarbon) gas of 5% is fed into the vacuum tank 1 and the total gas pressure of the vacuum tank 1 is controlled to be $6.7 \times 10^{-1}$ Pa ($5 \times 10^{-3}$ torr). Subsequently, high frequency power of 100 W (2.19 W/cm$^2$) is applied between the target and the electrode opposing to the target provided in the vacuum tank 1 and the target is sputtered, so that an under layer made of PTFE of approximately 400 Å thick are formed onto the surface of the substrate.

Furthermore, on the under layer 3 made of PTFE formed as described above, a recording layer 12 made of alloy of TeSe group of approximately 300 Å thick is formed by the sputtering method. Referring to the sputtering condition at this time, the reaction gas (argon gas) pressure is made $6.7 \times 10^{-1}$ Pa ($5 \times 10^{-3}$ torr) and the discharging power is made 40 W (0.88 W/cm$^2$).

EXAMPLE 7

Using argon gas mixed with TFC gas of 10% as a reaction gas, an under layer made of PTFE is formed under the same sputtering condition as that in the example 6 mentioned above. As to the sputtering conditions of the recording layer in the examples 7 to 12, since they are similar to that in the case of the example 6, the detailed explanations thereof are omitted in the examples 7 to 12.

EXAMPLE 8

Using argon gas mixed with TFC gas of 20% as a reaction gas, an under layer made of PTFE is formed under the same sputtering condition as those in the examples 1 and 2.

EXAMPLE 9

Using argon gas mixed with TFC gas of 40% as a reaction gas, an under layer made of PTFE is formed under the same sputtering condition as those in the examples 1 to 3.

EXAMPLE 10

Using argon gas mixed with TFC gas of 60% as a reaction gas, an under layer made of PTFE is formed under the same sputtering condition as those in the examples 1 to 4.

EXAMPLE 11

Using argon gas mixed with hydrogen gas of 5% as a reaction gas, an under layer made of PTFE is formed under the same sputtering condition as those in the examples 1 to 5.

EXAMPLE 12

Using argon gas mixed with hydrogen gas of 15% as a reaction gas, an under layer made of PTFE is formed under the same condition as those in the examples 1 to 5.

COMPARATIVE EXAMPLE TO EXAMPLES 6 TO 12

Using pure argon gas as a reaction gas, an under layer made of PTFE is formed under the same sputtering condition as those in the examples 6 to 12.

Referring to the optical information recording mediums according to the examples 6 to 12 and to the comparative example, the following table shows the laser power when a signal fluctuation of ±10% is generated in the case that the playback operation is repeated for ten hours and shows the relation between the component (F/C) and the value of the laser power, wherein the value F denotes the number of the fluorine atoms contained in the under layer and the value C denotes the number of the carbon atoms contained in the under layer. The values F and C are calculated from the signal intensity of $C_{ls}$ and $F_{ls}$ in XPS (X-ray photoelectron spectroscopy). The wavelength of the laser power for playback adapted to the present experiment is made 830 nm.

TABLE

| Example | F/C | Laser power generating signal fluctuation of ±10% (mW) |
|---|---|---|
| 6 | 1.75 | 1.2 |

TABLE-continued

| Example | F/C | Laser power generating signal fluctuation of ±10% (mW) |
|---|---|---|
| 7 | 1.69 | 1.3 |
| 8 | 1.55 | 1.4 |
| 9 | 1.30 | 1.5 |
| 10 | 1.27 | 1.6 |
| 11 | 1.80 | 1.2 |
| 12 | 1.61 | 1.4 |
| Comparative Ex. | 1.85 | 1.1 |

Figure 11:
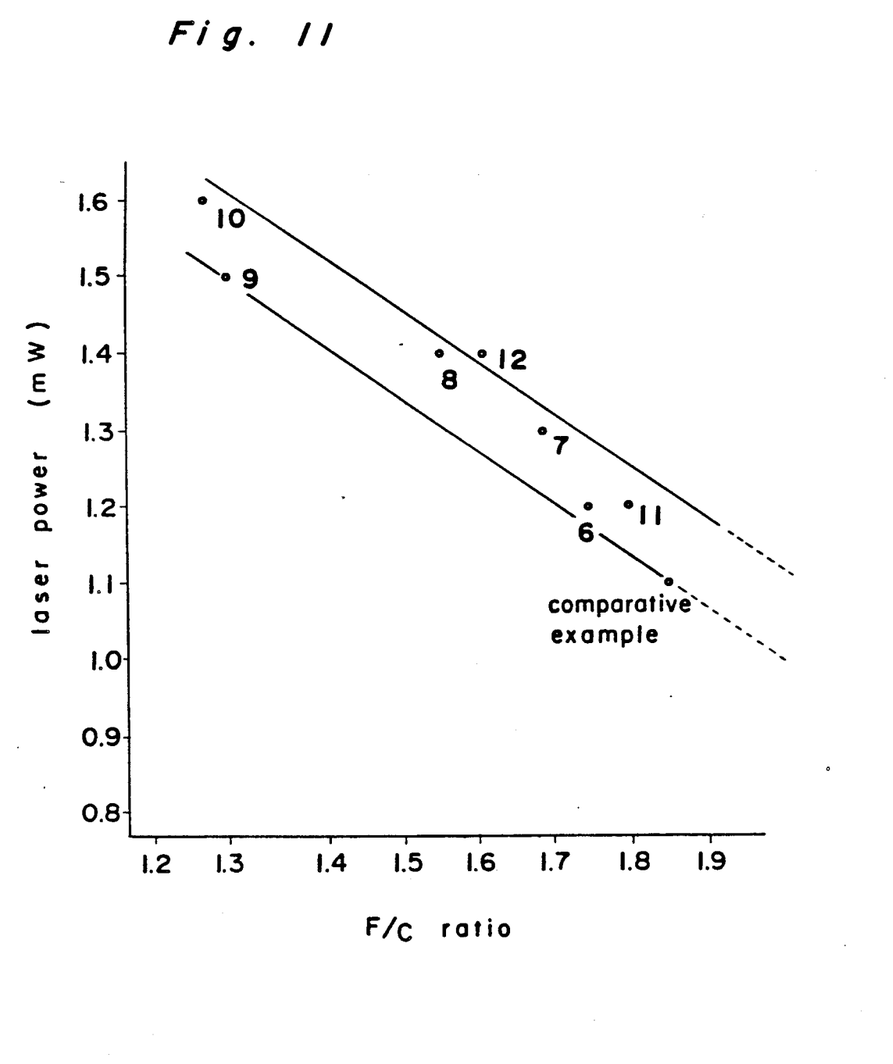
FIG. 11 is a graph showing an effect of the present invention.

FIG. 11 shows the relation between the component ratio F/C of the under layer and the laser power when generating the signal fluctuation of ±10% in the case of repeating the playback operation for ten hours. In this graph shown in FIG. 10, the horizontal axis represents the ratio (F/C) of the number of the fluorine atoms to the number of the carbon atoms contained in the under layer, the vertical axis represents the value of the laser power when generating the signal fluctuation of ±10% in the case of repeating the playback operation for ten hours and the added numerals shown in this graph denote the numbers of the examples mentioned above.

As shown in FIG. 11, it can be understood that, the smaller the ratio (F/C) of the number of the fluorine atoms to the number of the carbon atoms contained in the under layer, the larger the laser power generating the signal fluctuation of ±10% in the case of repeating the playback operation for ten hours can be made, in other words, the heat resistance of the uneven pattern of the substrate can be improved and the endurance life of the optical information recording medium can be prolonged.

When the ratio (F/C) of the number of the fluorine atoms to the number of the carbon atoms contained in the under layer is adjusted to approximately 1.8, the laser power generating the signal fluctuation of ±10% in the case of repeating the playback operation for ten hours in the optical information recording medium having an under layer made of PTFE can be made larger than approximately 1.2 mW, so that an optical information recording medium having better heat resistance and longer endurance life compared to those of an optical information recording medium having the under layer sputtered using pure argon gas in the case of the comparative example (in this case, the laser power is approximately 1.1 mW) can be provided. Though the laser power of 1.0 mW to 1.2 mW is needed in order to obtain a good playback information with high CN (carrier to noise level) ratio, the optical information recording medium having an under layer according to the present invention can also cover the value of the laser power.

Furthermore, if the ratio (F/C) of the number of the fluorine atoms contained in the under layer is adjusted to less than approximately 1.5, the laser power generating the signal fluctuation of ±10% in the case of repeating the playback operation for ten hours in the optical information recording medium having an under layer made of PTFE can be made more than approximately 1.5 mW, so that the optical information recording medium according to the present invention has the heat resistance, i.e., the endurance life equal to that of the optical information recording medium having an under layer made of guanine or an under layer made of hydrocarbon plasma polymerization film formed.

In an optical information recording medium having an under layer made of PTFE formed, wherein the ratio (F/C) of the number of the fluorine atoms to the number of the carbon atoms contained in the under layer is less than approximately 1.8, even though the laser beam for playback is repeatedly radiated, the wave shape of the read out signal is scarcely changed. Moreover, even though the ratio (F/C) of the number of the fluorine atoms to the number of the carbon atoms contained in the under layer is made less than approximately 1.8, the modulation factor of the pit at the time of radiating the laser beam for recording is not decreased and the recording sensitivity equal to that of the optical information recording medium of the comparative example can be obtained. However, if the ratio (F/C) is less than 1.0, the extinction rate of the under layer becomes more than 10% so that the recording and playback character becomes inferior, therefore, the ratio (F/C) should be made more than 1.0.

The essential point of the present invention is based on that the ratio (F/C) of the number of the fluorine atoms to the number of the carbon atoms contained in the under layer mainly including fluorine and carbon is adjusted to be less than 1.8, and the shape, structure, production method and the material, of the substrate, and the material and the film forming method of the recording layer are not limited to those shown in the examples and those may be designed in any necessary ones.

As described above, in the film forming method of an organic thin film according to the present invention, since the partial pressure of the target gas in the vacuum tank is adjusted to be more than 10%, the film forming speed can be increased about three times higher than that by the conventional sputtering method. In addition, since the method of forming a film made of organic materials according to the present invention is a sputtering method in principle, the quantity of the waste dust produced by the present method can be greatly decreased compared to that in the conventional plasma polymerization method.

Moreover, in the optical information recording medium according to the present invention, since the ratio (F/C) of the number of the fluorine atoms to the number of the carbon atoms contained in the under layer mainly including fluorine and carbon is adjusted in a range between less than 1.8 and more than 1.0 the heat resistance of the under layer is improved and the heat by the radiation of the laser beam for playback becomes hard to be transferred to the uneven pattern forming surface of the substrate so that the thermal deformation of the uneven pattern of the substrate can be prevented and the endurance life of the optical information recording medium can be furthermore prolonged.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method of producing an optical recording medium comprising:
    providing a vacuum film forming device comprising a vacuum tank and a cathode and a substrate holder accommodated in said vacuum tank;
    securing a polytetrafluoroethylene (PTFE) target plate to said cathode opposite to said substrate holder having a substrate attached thereto, said substrate being provided with a surface of uneven patterns for recording information;

creating a vacuum of about $6 \times 10^{-6}$ Torr in said vacuum tank; providing a gas mixture comprising a carbon fluoride gas and an inert gas in said vacuum tank so as to establish a plasma of said gas mixture having an internal gas pressure within said vacuum tank of about $4.5 \times 10^{-3}$ Torr;

gradually applying high frequency power to said cathode such that said gas plasma is ignited and said target plate is sputtered thereby forming an underlayer of a light permeable material of at least fluorine and carbon on the uneven pattern surface of said substrate such that a ratio of the number of fluorine atoms to carbon atoms is in a range of more than 1.0 but less than 1.8; and thereafter forming a recording layer on the surface of said under layer.

2. The method of claim 1, wherein said target plate made of polytetrafluoroethylene is securely bonded to the cathode with an adhesive material.

3. The method of claim 1, wherein the thickness of the target plate made of polytetrafluoroethylene is greater than 2.5 mm and less than 8 mm.

4. The method of claim 1, wherein said gas mixture is provided by feeding a first inert gas at a predetermined flow to said vacuum tank, subsequently feeding a second inert gas at a predetermined gas pressure intermittently into said vacuum tank, introducing said carbon fluoride gas, igniting the resulting gas plasma at which time said second inert gas is automatically interrupted, and, after the partial pressure of at least said carbon fluoride gas is adjusted to be more than 10%, sputtering of the target made of polytetrafluoroethylene.

5. The method of claim 1, wherein said carbon fluoride gas which comprises carbon tetrafloride gas having a partial pressure of from 5% to 60% of the total gas pressure in the vacuum tank is fed to the vacuum to which the inert gas has already been fed, before beginning of the sputtering.

6. The method of claim 1, wherein a hydrogen gas having a partial pressure of from 5% to 15% of the total gas pressure in the vacuum tank is fed to said vacuum tank to which the inert gas has already been fed, before the beginning of the sputtering.

7. The method of claim 1, wherein said substrate is a resin substrate having information as uneven patterns consisting of prepits and pregooves formed on one side of said substrate.

8. The method according to claim 1 wherein said under layer is about 400 Å thick.

9. The method of claim 1, wherein said recording layer is formed by sputtering using a target comprising Te in the vacuum tank.

10. The method according to claim 9, wherein said under layer is about 400 Å thick and said recording layer comprises an alloy of TeSe about 300 Å thick.

11. A method of producing an optical recording medium comprising:

providing a vacuum film forming device comprising a vacuum tank and a cathode and a substrate holder accommodated in said vacuum tank;

securing a polytetrafluoroethylene (PTFE) target plate to said cathode opposite to said substrate holder having a substrate attached thereto, said substrate being provided with a surface of uneven patterns for recording information;

creating a vacuum of about $6 \times 10^{-6}$ Torr in said vacuum tank;

providing a gas mixture comprising (1) a gas selected from the group consisting of hydrogen gas, hydrocarbon gas and fluorocarbon gas and (2) an inert gas in said vacuum tank so as to establish a plasma of said gas mixture having an internal gas pressure with said vacuum tank of about $4.5 \times 10^{-3}$ Torr.

gradually applying high frequency power to said cathode such that said gas plasma is ignited and said target plate is sputtered thereby forming an underlayer of a light permeable material of at least fluorine and carbon on the uneven pattern surface of said substrate such that a ratio of the number of fluorine atoms to carbon atoms is in a range of more than 1.0 but less than 1.8; and thereafter forming a recording layer on the surface of said under layer.

* * * * *